United States Patent
Ye et al.

(10) Patent No.: US 11,346,926 B2
(45) Date of Patent: May 31, 2022

(54) DETECTION DEVICE AND METHOD FOR ADJUSTING PARAMETER THEREOF

(71) Applicant: HESAI TECHNOLOGY CO., LTD., Shanghai (CN)

(72) Inventors: Liangchen Ye, Shanghai (CN); Shengping Mao, Shanghai (CN); Rui Wang, Shanghai (CN); Xuezhou Zhu, Shanghai (CN); Shaoqing Xiang, Shanghai (CN); Yifan Li, Shanghai (CN); Shixiang Wu, Shanghai (CN)

(73) Assignee: Hesai Technology Co., Ltd., Shanghai (CN)

(*) Notice: Subject to any disclaimer, the term of this patent is extended or adjusted under 35 U.S.C. 154(b) by 0 days.

(21) Appl. No.: 16/930,141

(22) Filed: Jul. 15, 2020

(65) Prior Publication Data

US 2020/0348402 A1    Nov. 5, 2020

Related U.S. Application Data

(63) Continuation of application No. PCT/CN2018/082396, filed on Apr. 9, 2018.

(30) Foreign Application Priority Data

Jan. 17, 2018 (CN) .......................... 201810046634.9
Jan. 17, 2018 (CN) .......................... 201810046635.3
(Continued)

(51) Int. Cl.
*G01S 17/931* (2020.01)
*G01S 7/497* (2006.01)
(Continued)

(52) U.S. Cl.
CPC ............ *G01S 7/497* (2013.01); *G01S 7/4972* (2013.01); *G01S 17/42* (2013.01); *G01S 17/931* (2020.01);
(Continued)

(58) Field of Classification Search
CPC ...... G01S 7/497; G01S 17/931; G01S 7/4972; G01S 17/42; G01S 2013/9323; G01S 13/931; H04N 5/23216
See application file for complete search history.

(56) References Cited

U.S. PATENT DOCUMENTS 5,767,803 A * 6/1998 Yamada ................ G01S 13/426
342/69
6,061,001 A * 5/2000 Sugimoto ................ B60Q 1/52
340/903
(Continued)

FOREIGN PATENT DOCUMENTS

CN  101398140 A  4/2009
CN  102592477 A  7/2012
(Continued)

OTHER PUBLICATIONS

PCT International Search Report and the Written Opinion dated Aug. 22, 2018, issued in related International Application No. PCT/CN2018/082396 with partial English translation (8 pages).
(Continued)

*Primary Examiner* — Timothy A Brainard
(74) *Attorney, Agent, or Firm* — Sheppard Mullin Richter & Hampton LLP

(57) ABSTRACT

The present invention provides a detection device and a method for adjusting a parameter thereof. The device includes a real-time collection module, configured to collect and obtain environment information in real time; a real-time location information obtaining module, configured to obtain
(Continued)

location information in real time; a parameter determining module, configured to determine a value of a target parameter of the detection device based on at least either the obtained environment information or the obtained location information; and a parameter adjustment module, configured to adjust the parameter of the detection device in real time based on the determined value of the target parameter. Based on the present invention, the parameter of the detection device can be adjusted in real time, and the detection device can adapt to diversified road conditions and improve detection accuracy.

12 Claims, 9 Drawing Sheets

(30) Foreign Application Priority Data

Jan. 17, 2018 (CN) .................. 201810046646.1
Jan. 17, 2018 (CN) .................. 201810046647.6

(51) Int. Cl.
  *G01S 17/42* (2006.01)
  *H04N 5/232* (2006.01)
  *G01S 13/931* (2020.01)

(52) U.S. Cl.
  CPC ........ *H04N 5/23216* (2013.01); *G01S 13/931* (2013.01); *G01S 2013/9323* (2020.01)

(56) References Cited

U.S. PATENT DOCUMENTS

| | | | |
|---|---|---|---|
| 6,795,014 B2 | 9/2004 | Cheong | |
| 7,227,620 B2 | 6/2007 | Egawa | |
| 8,824,741 B2 | 9/2014 | Walter | |
| 9,733,348 B2 | 8/2017 | Gazit et al. | |
| 2005/0046823 A1* | 3/2005 | Ando | G01S 7/4868 356/4.01 |
| 2008/0272955 A1 | 11/2008 | Yonak et al. | |
| 2016/0003938 A1* | 1/2016 | Gazit | G01S 13/02 342/81 |
| 2016/0306043 A1* | 10/2016 | Moss | G01S 7/4817 |
| 2017/0153326 A1 | 6/2017 | Grewe et al. | |
| 2017/0299707 A1 | 10/2017 | Nguyen | |
| 2017/0307759 A1 | 10/2017 | Pei et al. | |
| 2017/0328729 A1 | 11/2017 | Zhu et al. | |
| 2017/0328987 A1* | 11/2017 | Singer | G01S 17/42 |
| 2017/0350983 A1 | 12/2017 | Hall et al. | |
| 2018/0004210 A1* | 1/2018 | Iagnemma | G08G 1/096775 |
| 2018/0059248 A1* | 3/2018 | O'Keeffe | G01S 7/4817 |
| 2018/0107904 A1* | 4/2018 | Yang Mao | G01S 17/89 |
| 2018/0143322 A1* | 5/2018 | Rosenzweig | G01S 7/484 |
| 2018/0364334 A1* | 12/2018 | Xiang | G01S 17/42 |
| 2019/0179317 A1* | 6/2019 | Englard | G05D 1/0088 |
| 2019/0317503 A1* | 10/2019 | Droz | G01S 7/4818 |

FOREIGN PATENT DOCUMENTS

| | | |
|---|---|---|
| CN | 102648115 A | 8/2012 |
| CN | 102788591 A | 11/2012 |
| CN | 103217678 A | 7/2013 |
| CN | 103419713 A | 12/2013 |
| CN | 103499820 A | 1/2014 |
| CN | 104064989 A | 9/2014 |
| CN | 104260722 A | 1/2015 |
| CN | 204116603 U | 1/2015 |
| CN | 204631626 U | 9/2015 |
| CN | 105093925 A | 11/2015 |
| CN | 105242266 A | 1/2016 |
| CN | 106093913 A | 11/2016 |
| CN | 106291509 A | 1/2017 |
| CN | 106527428 A | 3/2017 |
| CN | 107031600 A | 8/2017 |
| CN | 107062024 A | 8/2017 |
| CN | 107076848 A | 8/2017 |
| CN | 107161141 A | 9/2017 |
| CN | 107167787 A | 9/2017 |
| CN | 107200017 A | 9/2017 |
| CN | 107364389 A | 11/2017 |
| CN | 107505940 A | 12/2017 |
| CN | 206773191 U | 12/2017 |
| EP | 1130416 A2 | 9/2001 |
| EP | 3187895 A1 | 7/2017 |
| JP | H05196736 A | 8/1993 |
| JP | H11-153664 A | 6/1999 |
| JP | 2004-151080 A | 5/2004 |
| JP | 2006-30147 A | 2/2006 |
| JP | 2007-139594 A | 6/2007 |
| JP | 2015-125109 A | 7/2015 |

OTHER PUBLICATIONS

First Search dated Jul. 19, 2019, issued in related Chinese Application No. 201810046635.3 (2 pages).
First Office Action dated Aug. 1, 2019, issued in related Chinese Application No. 201810046635.3, with English machine translation (16 pages).
Second Office Action dated Oct. 24, 2019, issued in related Chinese Application No. 201810046635.3, with English machine translation (10 pages).
First Search dated Jul. 5, 2019, issued in related Chinese Application No. 201810046646.1 (2 pages).
First Office Action dated Jul. 12, 2019, issued in related Chinese Application No. 201810046646.1, with English machine translation (22 pages).
Supplementary Search dated Oct. 24, 2019, issued in related Chinese Application No. 201810046646.1 (2 pages).
Supplementary Search dated Feb. 13, 2020, issued in related Chinese Application No. 201810046646.1 (1 page).
Second Office Action dated Oct. 29, 2019, issued in related Chinese Application No. 201810046646.1, with English machine translation (18 pages).
Third Office Action dated Feb. 18, 2020, issued in related Chinese Application No. 201810046646.1, with English machine translation (20 pages).
First Search dated Jul. 4, 2019, issued in related Chinese Application No. 201810046634.9 (3 pages).
First Office Action dated Jul. 15, 2019, issued in related Chinese Application No. 201810046634.9, with English machine translation (16 pages).
Supplementary Search dated Sep. 25, 2019, issued in related Chinese Application No. 201810046634.9 (2 pages).
Supplementary Search dated Nov. 29, 2019, issued in related Chinese Application No. 201810046634.9 (1 page).
Second Office Action dated Oct. 11, 2019, issued in related Chinese Application No. 201810046634.9, with English machine translation (14 pages).
Third Office Action dated Dec. 9, 2019, issued in related Chinese Application No. 201810046634.9, with English machine translation (17 pages).
First Search dated Jul. 25, 2019, issued in related Chinese Application No. 201810046647.6 (1 page).
First Office Action dated Aug. 2, 2019, issued in related Chinese Application No. 201810046647.6, with English machine translation (11 pages).
Second Office Action dated Nov. 26, 2019, issued in related Chinese Application No. 201810046647.6, with English machine translation (16 pages).
Radar Anti-Jamming Technology, leixing, Mar. 31, 2016, pp. 106-107.
Extended European Search Report dated Feb. 2, 2021, issued in related European Application No. 18901411.1 (8 pages).
PCT International Preliminary Report on Patentability dated Jul. 30, 2020, issued in related International Application Mo PCT/CN2018/082396, with English translation (10 pages).

(56) References Cited

OTHER PUBLICATIONS

Notice of Reasons for Refusal dated Dec. 7, 2021, issued in related Japanese Application No. 2020-539238, with English machine translation (4 pages).

* cited by examiner

DETECTION DEVICE AND METHOD FOR ADJUSTING PARAMETER THEREOF

CROSS REFERENCE TO RELATED APPLICATIONS

This application is a continuation of PCT International Patent Application No. PCT/CN2018/082396, filed on Apr. 9, 2018, which claims priority to Chinese Patent Application No. 201810046646.1 entitled "VEHICLE-MOUNTED DETECTION DEVICE AND METHOD FOR ADJUSTING PARAMETER THEREOF, MEDIUM, AND DETECTION SYSTEM" filed on Jan. 17, 2018, Chinese Patent Application No. 201810046634.9 entitled "METHOD FOR ADJUSTING ORIENTATION OF FIELD-OF-VIEW CENTER OF LIDAR, MEDIUM, AND LIDAR SYSTEM" filed on Jan. 17, 2018, Chinese Patent Application No. 201810046635.3 entitled "METHOD FOR ADJUSTING FIELD OF VIEW OF LIDAR" filed on Jan. 17, 2018, and Chinese Patent Application No. 201810046647.6 entitled "LIDAR SYSTEM, METHOD FOR PROCESSING POINT CLOUD DATA OF LIDAR, AND READABLE MEDIUM", filed on Jan. 17, 2018, all of which are incorporated herein by reference in their entirety.

BACKGROUND

Technical Field

The present application relates to the field of autonomous driving technologies, and in particular, to a detection device and a method for adjusting a parameter thereof.

Related Art

Due to capabilities of detecting a three-dimensional coordinate model of an object around a vehicle body and achieving a purpose of environment perception, lidar is widely applied in various fields such as autonomous driving. With the development of driverless technologies, a wide field of view, a high resolution, and long ranging have become main development directions of lidars in the future.

The high resolution of the lidar contradicts its long ranging because the high resolution makes distribution of laser light denser in a space, decreases a laser power threshold for human eye safety, and then reduces ranging distance of the lidar. Meanwhile, for a lidar with the same pixel points, a wider field of view means a lower resolution of the image. Therefore, on condition of the same cost, a wider field of view of the lidar also contradicts its high resolution. That is, a wider field of view means a lower resolution, and a narrower field of view means a higher resolution. The size of the field of view of the lidar in the prior art is fixed. For example, when a rotary mechanical lidar HDL-64E of Velodyne has N pairs of transceiver modules longitudinally, each pair of transceiver modules is responsible for the field of view at a specific angle longitudinally, and corresponds to a fixed field of view.

For a lidar used in the field of autonomous driving, due to a fixed size of its field of view, in some scenarios, in order to improve an angular resolution of the lidar, only the number of pairs of the transceiver modules has to be increased, thereby increasing the size, power consumption, and costs of the lidar system. In addition, this will increase a safety threshold of human eyes and reduce a ranging distance.

SUMMARY

To resolve the technical problems in the prior art, the embodiments of the present specification provide a detection device and a method for adjusting a parameter thereof. The technical solutions are as follows:

According to a first aspect, a detection device is provided, including: a real-time collection module, configured to collect and obtain environment information in real time; a real-time location information obtaining module, configured to obtain location information in real time; a parameter determining module, configured to determine a value of a target parameter of the detection device based on at least either the obtained environment information or the obtained location information; and a parameter adjustment module, configured to adjust the parameter of the detection device in real time based on the determined value of the target parameter.

According to a second aspect, a method for adjusting a parameter of a detection device is provided, including: collecting and obtaining environment information around a vehicle in real time; obtaining location information of the vehicle in real time; determining a value of a target parameter of a vehicle-mounted detection device based on the obtained environment information around the vehicle and the location information of the vehicle; and adjusting the parameter of the vehicle-mounted detection device in real time based on the determined value of the target parameter.

This specification can achieve the following beneficial effects: By collecting and obtaining the environment information around the detection device and the location information of the vehicle in real time, the value of the target parameter of the detection device is determined based on the obtained environment information around the vehicle and the location information of the vehicle, and then the parameter of the detection device is adjusted in real time based on the determined value of the target parameter, thereby adapting to diversified road conditions and improving detection accuracy of the detection device.

BRIEF DESCRIPTION OF THE DRAWINGS

Specific implementations of this specification are further described in detail below with reference to the accompanying drawings.

DETAILED DESCRIPTION

To make a person skilled in the art better understand solutions of this specification, the following clearly and completely describes the technical solutions in the embodiments of this specification with reference to the accompanying drawings in the embodiments of this specification. Apparently, the described embodiments are some of the embodiments of this specification rather than all of the embodiments. All other embodiments obtained by a person of ordinary skill in the art based on the embodiments of this specification without creative efforts shall fall within the protection scope of this specification.

Figure 1:
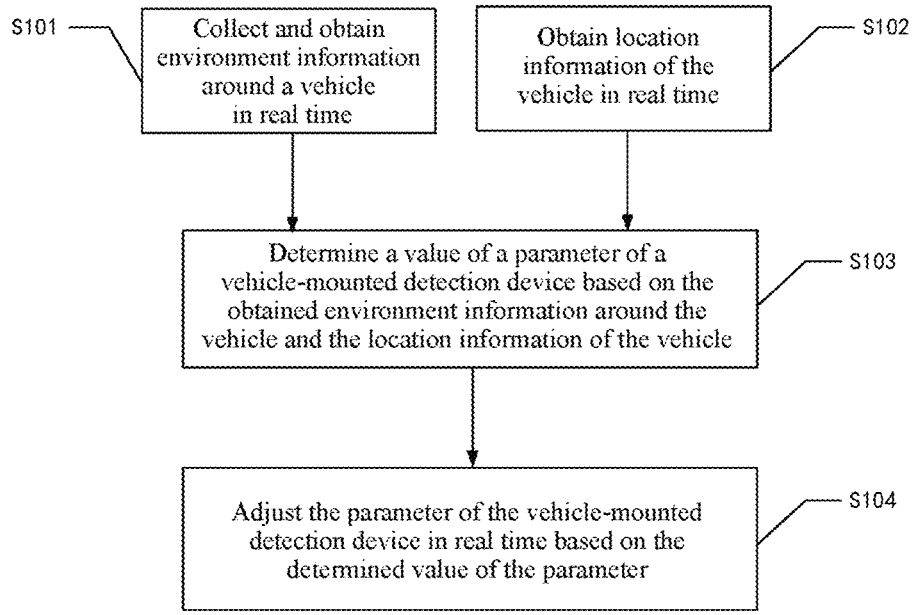
FIG. 1 is a flowchart of a method for adjusting a parameter of a detection device according to an embodiment of this specification.

Referring to FIG. 1, an embodiment of the present invention provides a method for adjusting a parameter of a vehicle-mounted detection device. The method may include the following steps:

Step S101: Collect and obtain environment information around a vehicle in real time.

In specific implementation, the environment information may include weather information, road condition information, traffic indication information, or one or more thereof. The road condition information may include information about road conditions, for example, rain, snow or fog conditions on a road, and rugged road conditions; and may include traffic conditions and information about a vehicle movement state, for example, traffic congestion, existence of high-intensity glare on the road, and left turn of the vehicle. The traffic indication information may include traffic light indication information, lane line indication information, road sign information, and the like. The environment information around the vehicle may be collected and obtained in real time by one or more vehicle-mounted detection devices such as a sensor device. For example, environment information such as traffic lights, lane line information, road signs, and other surrounding vehicles may be obtained by a vision sensor. The vehicle-mounted detection device may be an environment sensing device such as a lidar, a vision sensor, a millimeter wave radar, a laser rangefinder, an infrared night vision device, or may be a body state sensing device. In a possible embodiment, the body state sensing device is an INS, or a system that integrates a GPS and an INS.

In a possible embodiment, the environment information around the vehicle is obtained by a lidar. The lidar may transmit a laser pulse signal. After meeting a target obstacle, the transmitted laser pulse signal is reflected by the target obstacle and is received by a detection system. A distance of the corresponding target obstacle may be measured by measuring a round-trip time of laser light. For example, the distance of the corresponding target obstacle is measured by using a time of flight (TOF) method. By scanning and detecting the entire target region, the lidar can finally implement three-dimensional imaging. A three-dimensional image includes environment information around the vehicle.

Step S102: Obtain the location information of the vehicle in real time.

The location information may include: an absolute location of the vehicle, and map information near the absolute location. For example, the location information includes: an absolute location of the vehicle, and high-precision map information near the absolute location. Location information around the vehicle may be obtained in real time through a GPS navigation system and a real-time Internet map. For example, the absolute position of the vehicle is obtained in real time through a GPS navigation system, and the high-precision map near the absolute position is obtained in real time by downloading from the Internet. The high-precision map may include basic two-dimensional road data, for example, lane marks and surrounding infrastructure, and may include data related to traffic control, road construction, and wide-area weather, and may further include fast changing dynamic data such as accidents, congestion, surrounding vehicles, pedestrians, and signal lights. The dynamic data may be characterized by a relatively high update speed and a relatively high positioning precision, for example, a minute-level or second-level update speed, and a centimeter-level positioning precision.

Step S103: Determine a value of a target parameter of a vehicle-mounted detection device based on the obtained environment information around the vehicle and the location information of the vehicle.

The vehicle-mounted device may include a lidar, a vision sensor, a millimeter wave radar, a laser rangefinder, an infrared night vision device, or one or more thereof. When the vehicle-mounted detection device is a lidar, the target parameters of the vehicle-mounted detection device include a field-of-view range of the lidar, a wavelength of the lidar, a horizontal resolution of the lidar, a vertical resolution of the lidar, a scanning frequency of the lidar, a beam tilt angle of the lidar, a power of the lidar, or one or more thereof. The field-of-view range of the lidar is the size of a field of view of the lidar. The vehicle-mounted detection device is a lidar. During the movement process of the vehicle, the environment information and the location information are collected and obtained in real time, and then a target region is generated based on the environment information and location information that are obtained in real time, and the orientation of the field of view of the lidar is adjusted to the target region. Because the target region can be generated in real time and the lidar can be adjusted to the target region, the size of the target region can be adjusted in real time based on the current environment information and location information without increasing costs or affecting the ranging distance. In this way, the size of the field of view of the lidar is adjusted in real time to fit scenes that require different resolutions.

In a possible embodiment, the vehicle-mounted detection device is a lidar. During the movement process of the vehicle, the environment information and the location information are collected and obtained in real time, and then a desired detection angle is generated based on the environment information and location information that are obtained in real time, and the beam tilt angle of the lidar such as the orientation angle at the center of the field of view is adjusted to the desired detection angle. Because the desired detection angle can be generated in real time and the orientation of the lidar can be adjusted to the desired detection angle, the beam tilt angle of the lidar can be adjusted in real time based on the real-time environment information and location information to fit different scenes during the movement process.

When the in-vehicle detection device is a lidar, the desired detection angle may be generated in the following way based on the current road condition information: When the road condition information is a flat road, the angle that coincides with the vehicle centerline is used as the desired detection angle to obtain more surrounding environment information; when the road condition information is an uphill road, an angle obtained by deviating the vehicle centerline downward by a preset first angle is used as the desired detection angle to obtain more ground environment information and avoid the problem of loss of effective ground information caused by an overhead orientation of the field of view of the lidar; when the road condition information is a downhill road, an angle obtained by deviating the vehicle centerline upward by a preset second angle is used as the desired detection angle to obtain more surrounding environment information and avoid the problem that the field of view of the lidar can obtain only the environment information at a near distance; when the road condition information is a left turn, an angle obtained by deviating the vehicle centerline leftward by a preset third angle is used as the desired detection angle to obtain more left side environment information; and, when the road condition information is a right turn, an angle obtained by deviating the vehicle centerline rightward by a preset fourth angle is used as the desired detection angle to obtain more right side environment information.

In a possible embodiment, the vehicle-mounted detection device is a lidar. During the movement process of the vehicle, the environment information around the vehicle, such as a reflectance of road obstacles, is collected and obtained in real time, and then the value of the power of the lidar is determined based on the obtained environment information, and the power of the lidar is adjusted. The power of the lidar is adjusted dynamically according to the environment information collected in real time, such as the reflectance of road obstacles, thereby reducing the power consumption of the lidar without omitting obstacles.

In a possible embodiment, a local environment map corresponding to the vehicle may be constructed based on the obtained environment information around the vehicle and the location information. Then a preset region around the vehicle is selected in the local environment map. Thereafter a local movement route of the vehicle and the value of the target parameter of the vehicle-mounted detection device are calculated in the preset region. In specific implementation, the local movement route for the vehicle to meet traffic rules and safety requirements and the value of the target parameter of the vehicle-mounted detection device may be calculated in the preset region according to the traffic rules and the safety requirements. Alternatively, the local movement route of the vehicle and the value of the target parameter of the vehicle-mounted detection device may be calculated in the preset region according to other criteria. This is not limited in this embodiment of the present invention. In specific implementation, the absolute location information of the vehicle, information on other vehicles around the vehicle, and road environment perception information may be integrated with the high-precision map information to create a local environment map corresponding to the vehicle. Alternatively, the local environment map corresponding to the vehicle may be created based on other location information and environment information. This is not limited in this embodiment of the present invention.

Step S104: Adjust the parameter of the vehicle-mounted detection device in real time based on the determined value of the target parameter.

The parameter of the vehicle-mounted detection device may be adjusted in real time by sending a control instruction to the vehicle-mounted detection device, or the parameter of the vehicle-mounted detection device may be manually adjusted, which is not limited in this specification.

In a possible embodiment, when the vehicle is moving uphill or downhill, the value of the beam tilt angle such as a pitch angle of the lidar or the vision sensor may be determined according to real-time road condition information, and then the beam tilt angle of the lidar or the vision sensor may be adjusted by using a control instruction. When the vehicle is moving on an expressway, more attention may be paid to the field of view directly ahead. When the vehicle is moving on a city street, it is necessary to pay attention to an entire field-of-view range. By collecting environmental information and location information in real time, the vehicle-mounted detection device can adjust the field-of-view range in real time and reduce the probability of omitting target obstacles.

Understandably, steps S101 and S102 are only used to distinguish between two different obtaining actions, but do not limit specific order of the obtaining actions. In specific implementation, step S101 may be performed before step S102, or step S102 may be performed before step S101, or the two steps may be performed in parallel. The vehicle-mounted detection device configured to collect and obtain environment information around the vehicle in real time may be exactly the same as, partly the same as, or completely different from the vehicle-mounted detection device that adjusts parameters in real time.

In a possible embodiment, the vehicle-mounted detection device configured to collect and obtain environment information around the vehicle in real time is exactly the same as the vehicle-mounted detection device that adjusts parameters in real time. For example, a lidar collects and obtains the environment information around the vehicle in real time, and then adjusts the parameter of the lidar in real time based on the determined value of the target parameter; or a vision sensor collects and obtains the environment information around the vehicle in real time, and then adjusts the parameter of the vision sensor in real time based on the determined value of the target parameter; or a lidar and a vision sensor collect and obtain the environment information around the vehicle in real time, and then adjust the parameters of the lidar and the vision sensor in real time based on the determined value of the target parameter.

In a possible embodiment, the vehicle-mounted detection device configured to collect and obtain environment information around the vehicle in real time is completely different from the vehicle-mounted detection device that adjusts parameters in real time. For example, a lidar collects and obtains the environment information around the vehicle in real time, and then adjusts the parameter of the vision sensor in real time based on the determined value of the target parameter; or a vision sensor and an infrared night vision device collect and obtain the environment information around the vehicle in real time, and then adjust the parameter of the lidar in real time based on the determined value of the target parameter; or a vision sensor collect and obtain the environment information around the vehicle in real time, and then adjust the parameters of the lidar and the infrared night vision device in real time based on the determined value of the target parameter.

In a possible embodiment, the vehicle-mounted detection device configured to collect and obtain environment information around the vehicle in real time is partly the same as the vehicle-mounted detection device that adjusts parameters in real time. For example, a lidar and a vision sensor collect and obtain the environment information around the vehicle in real time, and then adjust the parameter of the vision sensor in real time based on the determined value of the target parameter.

In conclusion, by collecting and obtaining the environment information around the vehicle and the location information of the vehicle in real time, the value of the target parameter of the vehicle-mounted detection device is determined based on the obtained environment information around the vehicle and the location information of the vehicle, and then the parameter of the vehicle-mounted detection device is adjusted in real time based on the determined value of the target parameter, thereby adapting to diversified road conditions, improving detection accuracy of the vehicle-mounted detection device, and improving accuracy and safety of a driverless vehicle.

Figure 2:
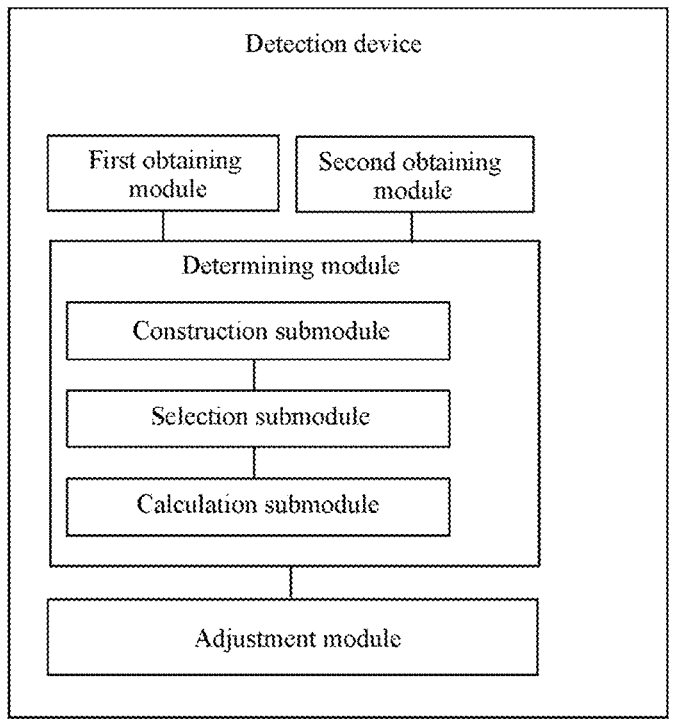
FIG. 2 is a schematic structural diagram of a vehicle-mounted detection device according to an embodiment of this specification.

To enable those skilled in the art to better understand and implement the present invention, an embodiment of the present invention further provides a vehicle-mounted detection device capable of implementing the method for adjusting a parameter of a vehicle-mounted detection device, as shown in FIG. 2.

Referring to FIG. 2, the vehicle-mounted detection device may include a first obtaining module, a second obtaining module, a determining module, and an adjustment module.

The first obtaining module is configured to collect and obtain environment information around a vehicle in real time.

The second obtaining module is configured to obtain location information of the vehicle in real time.

The determining module is configured to determine a value of a target parameter of a vehicle-mounted detection device based on the obtained environment information around the vehicle and the location information of the vehicle.

The adjustment module is configured to adjust the parameter of the vehicle-mounted detection device in real time based on the determined value of the target parameter.

In specific implementation, for the working process and principles of the vehicle-mounted detection device, reference may be made to the description in the method provided in the foregoing embodiment, and details are omitted here.

Figure 3:
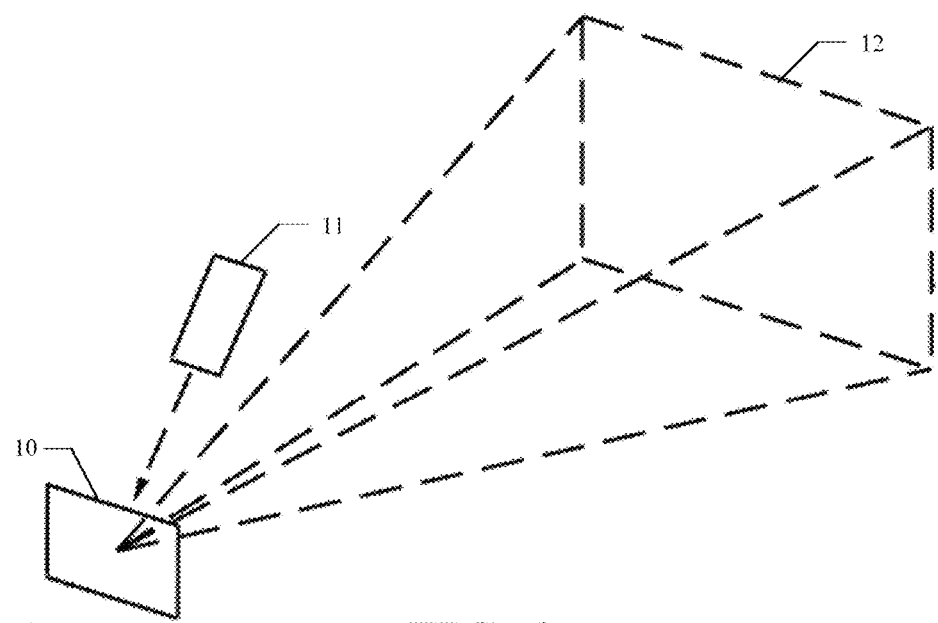
FIG. 3 is a schematic structural diagram of a lidar system in the prior art.

As shown in FIG. 3, an existing lidar system includes a scanning module 10 and a laser transceiver module 11. The scanning module 10 is configured to reflect a laser pulse signal, which is transmitted by the laser transceiver module 11, into a space, receive a laser pulse echo signal reflected from a space obstacle, and then reflect the laser pulse echo signal to the laser transceiver module 11 to implement measurement of space coordinates. A two-dimensional space corresponding to echo signals detectable by the laser transceiver module 11 is a field of view 12 of the lidar system. To improve the angular resolution of the existing lidar, the number of pairs of the transceiver modules has to be doubled. The increase of the pairs of the transceiver modules not only leads to a sharp increase in costs, but also greatly increases the size and complexity of the system, thereby reducing reliability of the system. In addition, the increase of the longitudinal angular resolution may also increase futile information of some non-critical regions, and increase the processing complexity of a sensing system.

Figure 4:
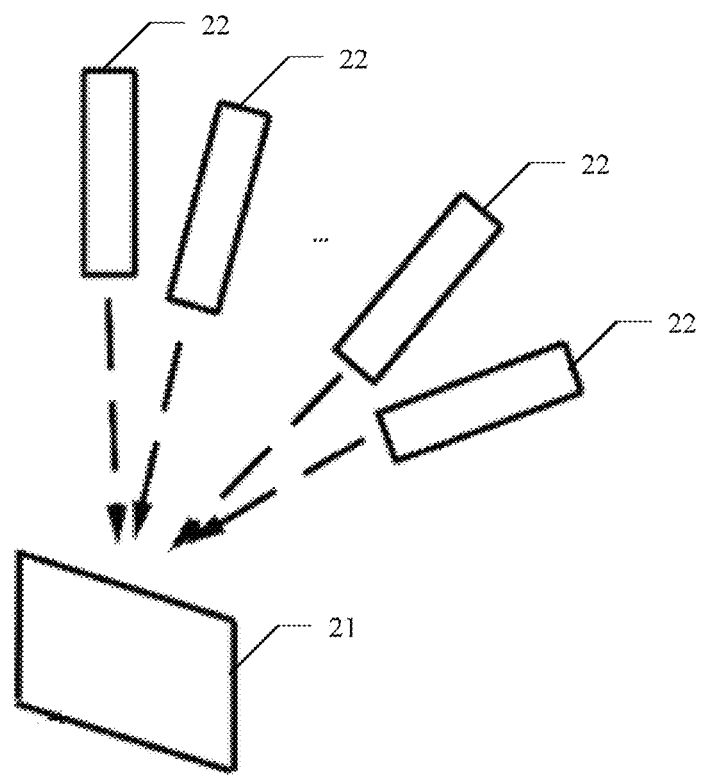
FIG. 4 is a schematic structural diagram of a lidar system according to an embodiment of this specification.

As shown in FIG. 4, an embodiment of the present specification provides a lidar system. The lidar system includes a scanning module 21 and multiple laser transceiver modules 22. The scanning module 21 is configured to reflect a laser pulse signal into a space, and receive a laser pulse echo signal reflected by a space obstacle. Each laser transceiver module 22 is incident on the scanning module 21 at a corresponding preset angle, and an overlapping region exists between fields of view corresponding to at least two laser transceiver modules 22. In specific implementation, the scanning module 21 may be a two-dimensional galvanometer. The galvanometer reflects the laser pulse signal, which is transmitted by multiple laser transceiver modules 22, to the space, and receives the laser pulse echo signal reflected by the space obstacle.

In specific implementation, the corresponding field of view of a laser transceiver module is small, and the resolution is also low, especially for long-distance regions. Therefore, multiple laser transceiver modules may be applied. Each laser transceiver module is incident on the same scanning module at a corresponding incident angle to form multiple corresponding fields of view in the space. By presetting a reasonable angle, the multiple fields of view can form a densified field of view by overlapping different regions in the space. In the densified region, the angular resolution can be doubled.

The multiple laser transceiver modules can stitch regions in the space to form multiple fields of view to increase the size of the field of view of the lidar.

Because the multiple laser transceiver modules can increase the size of the field of view of the lidar, the indicator requirements on the size of the field of view of a scanning module can be reduced, thereby facilitating the implementation of other scanning modules of better performance parameters. For example, the indicator requirements on the size of the field of view of a two-dimensional galvanometer can be reduced, thereby facilitating the implementation of other two-dimensional galvanometers of better performance parameters.

In a possible embodiment, the laser transceiver module 22 includes a coaxial laser transceiver module, in which an optical axis of a transmitting optical path coincides with an optical axis of a receiving optical path. In another embodiment of the present invention, the laser transceiver module 22 includes a non-coaxial laser transceiver module, in which an optical axis of a transmitting optical path does not coincide with an optical axis of a receiving optical path.

In specific implementation, the overlapping region of the field of view may be a region at the center of the field of view, a region above the center of the field of view, or a region below the center of the field of view. A proper preset angle may be set according to actual needs, so that a region expected to be primarily detected is the overlapping region.

In specific implementation, the overlapping region may be an overlapping region of a horizontal (that is, landscape) field of view, or an overlapping region of a vertical (that is, portrait) field of view.

In specific implementation, the overlapping region may be obtained by stitching two, three, four or more fields of view.

Figure 5:
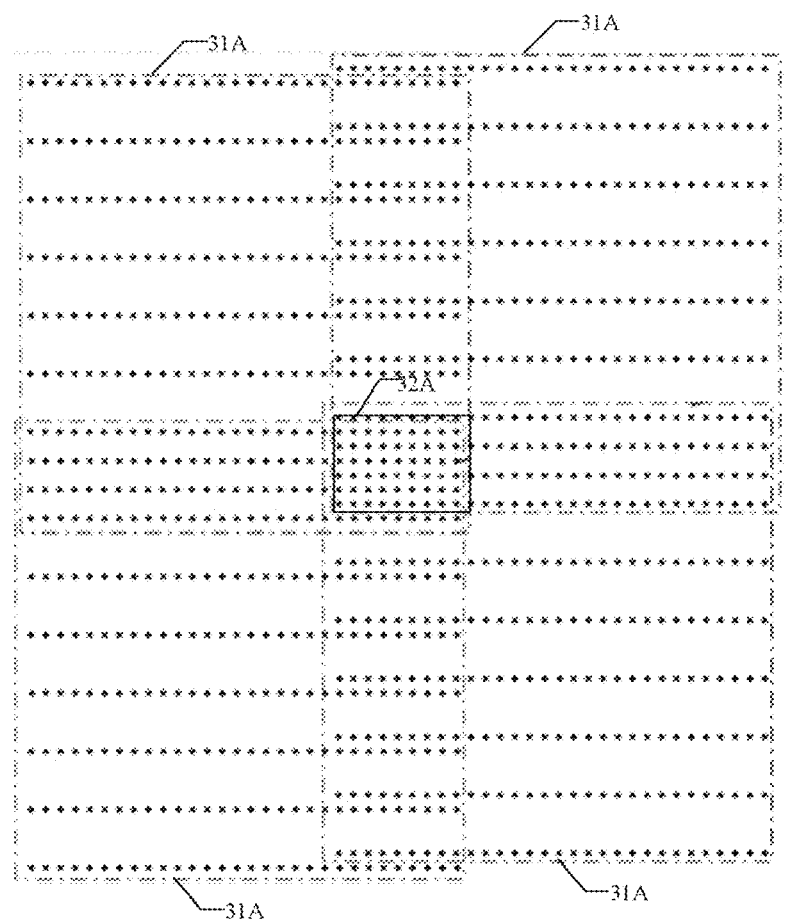
FIG. 5 is a schematic diagram of stitching a field of view in a lidar system according to an embodiment of this specification.

In a possible embodiment, FIG. 5 is a schematic diagram of stitching fields of view corresponding to the lidar system shown in FIG. 4.

Referring to FIG. 5, four laser transceiver modules 22 form a basic field of view 31A vertically, in which the amount of point cloud data is small, the angular resolution is low, and the field-of-view range is small. After the four fields of view are stitched, a wider field-of-view range can be obtained. At the same time, there is a lot of point cloud data in the overlapping region 32A, and a densified field of view can be formed in which the angular resolution is doubled.

Figure 6:
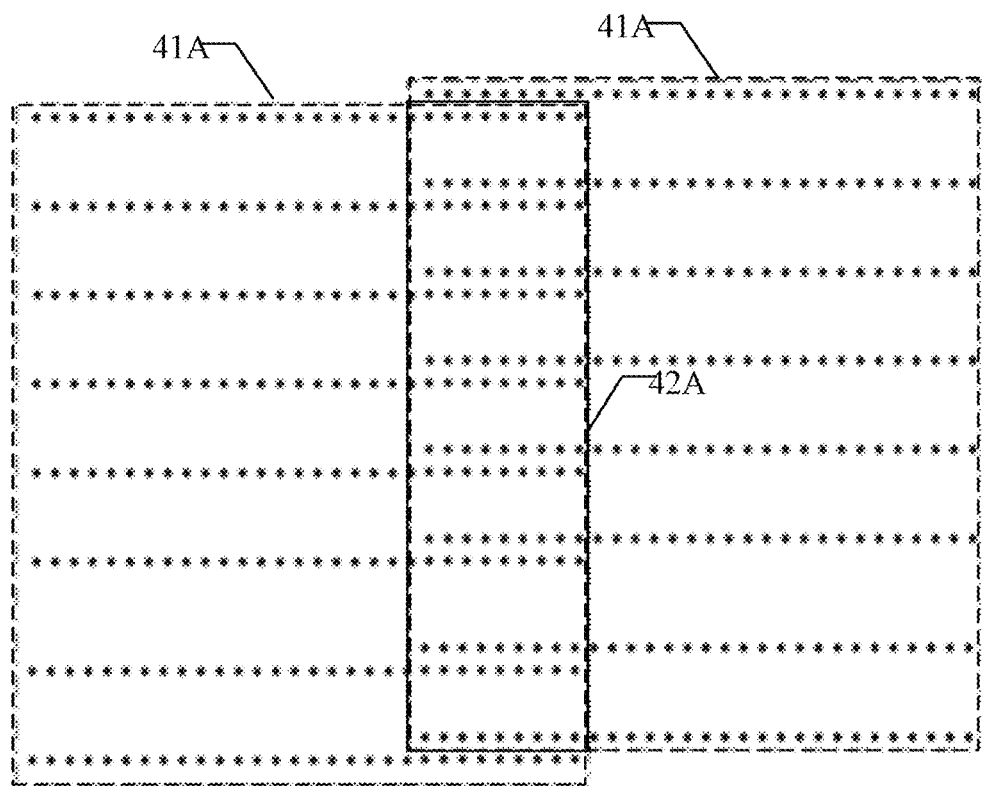
FIG. 6 is a schematic diagram of stitching a field of view in a lidar system according to an embodiment of this specification.

In another embodiment of the present invention, FIG. 6 is a schematic diagram of stitching fields of view corresponding to the lidar system shown in FIG. 4.

Referring to FIG. 6, two laser transceiver modules 22 form a basic field of view 41A vertically, in which the amount of point cloud data is small, the angular resolution is low, and the field-of-view range is small. After the two fields of view are stitched, a wider field-of-view range can be obtained. At the same time, there is a lot of point cloud data in the overlapping region 42A, and a densified field of view can be formed in which the angular resolution is doubled.

In specific implementation, for short-distance scenes, the low angular resolution of the basic field of view can meet the resolution requirements of a driverless driving system. For long-distance scenes, in order to recognize objects of the same size, a higher angular resolution is required. In an actual driving process, the system essentially pays attention to the objects right ahead of the vehicle. Therefore, by designing a reasonable preset angle, the overlapping region of the field of view is a long-distance region right ahead. This not only satisfies the high-resolution, short-distance and long-distance detection requirements of the driverless driving system, but also reduces the design requirements on the resolution in non-critical regions, and reduces the complexity and cost of the lidar.

In specific implementation, the overlapping region may be obtained by stitching vertical fields of view, or may be obtained by stitching horizontal fields of view.

Figure 7:
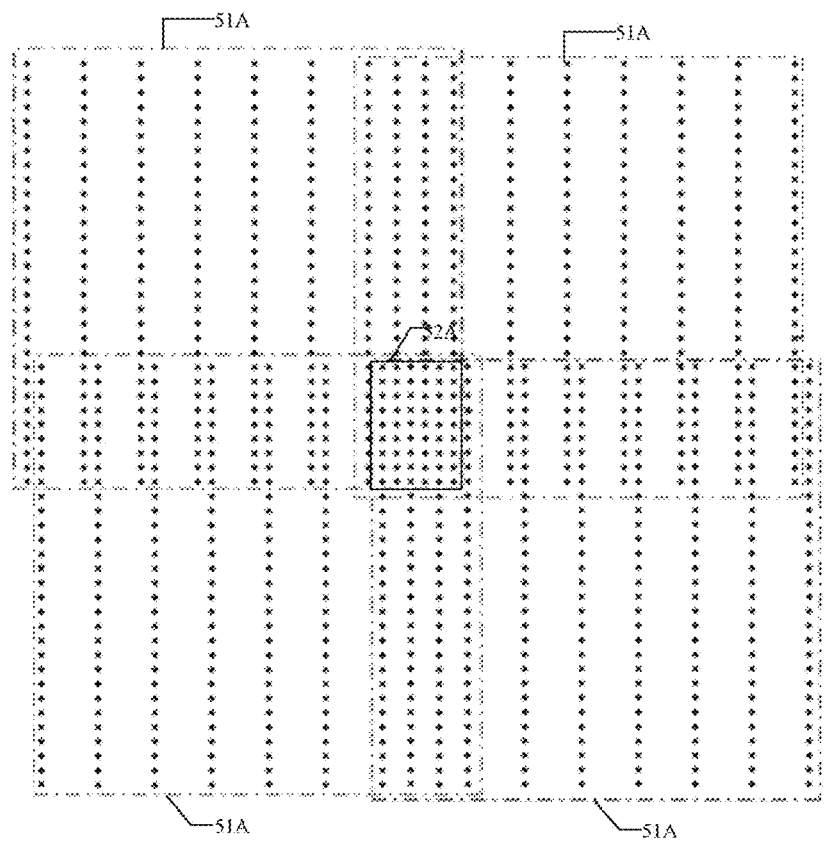
FIG. 7 is a schematic diagram of stitching a field of view in a lidar system according to an embodiment of this specification.

In another embodiment of the present invention, FIG. 7 shows the field of view corresponding to the lidar system shown in FIG. 4. The angular resolution of the basic field of view 51A formed by the four laser transceiver modules 22 horizontally is low, and the amount of point cloud data is small. After the four fields of view are stitched, a wider field-of-view range can be obtained. At the same time, there is a lot of point cloud data in the overlapping region 52A, and a densified field of view can be formed in which the angular resolution is doubled.

By applying the above lidar system, and by setting a reasonable preset angle, a small number of low-resolution transceiver modules can be used to stitch regions in a space to form multiple fields of view that have an overlap region. On the one hand, the overlapping region can meet long-distance high-resolution detection requirements. On the other hand, non-overlapping regions meet the low-resolution design requirements of non-critical regions, so as to reduce the processing complexity of the sensing system. Therefore, the lidar system provided in the embodiments of the present invention can improve the angular resolution of the lidar at a lower cost and a lower system processing complexity. For the overlapping region, dense point cloud data can be obtained, and the angular resolution is doubled. Therefore, the accuracy of object detection of the lidar can be improved by processing the dense point cloud data.

In some possible scenarios, the inability of the lidar to adjust the orientation of the center of the field of view will cause deviation of the field of view in some scenes, and make it impossible to collect effective point cloud data. For example, when a vehicle moves uphill, the inability to adjust the orientation of the center of the field of view will cause the field of view of the lidar to deflect to the sky, thereby losing a lot of effective ground information.

Figure 8:
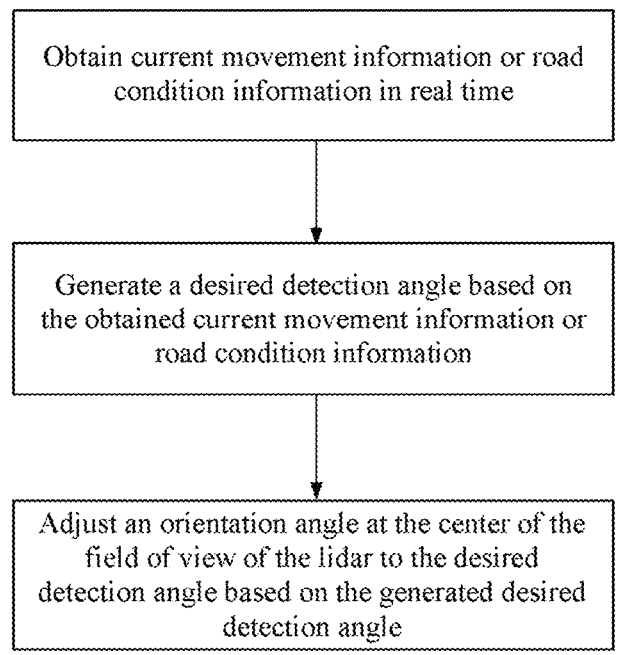
FIG. 8 is a detailed flowchart of a method for adjusting an orientation at a center of a field of view of a lidar according to an embodiment of this specification.

In a possible embodiment, as shown in FIG. 8, the current movement information or road condition information is obtained in real time first. In specific implementation, the center of the field of view of the existing lidar is fixed relative to the body coordinate system, and cannot be adapted to different scenes. For example, when the vehicle moves uphill, the orientation angle at the center of the field of view will deflect to the sky, thereby losing a lot of effective ground information. In this embodiment of the present invention, the current movement information or road condition information is obtained in real time, and then the orientation angle at the center of the field of view of the lidar is adjusted according to the movement information or road condition information that are obtained in real time. The movement information may include: uphill movement, downhill movement, flat road movement, left turn movement, right turn movement. The road condition information may include: uphill road condition, downhill road condition, and flat road condition.

Current road condition information may be obtained in real time based on a pre-downloaded map such as simultaneous localization and mapping (SLAM), or the current road condition information may be obtained in real time based on a point cloud map constructed by the lidar, or the current road condition information may be obtained in real time based on data captured by a vehicle-mounted camera.

The current movement information may be obtained in real time based on sensor parameters inside an autonomous driving system such as a steering wheel parameter. This is not limited in this embodiment of the present invention.

A desired detection angle is generated based on the obtained current movement information or road condition information. Because different movement directions or different road condition information correspond to different desired orientations, the desired detection angle may be generated based on the obtained current movement information or road condition information. The desired detection angle may change along a horizontal field of view, or may change along a vertical field of view, which is not limited in this embodiment of the present invention.

In a possible embodiment, the desired detection angle may be generated in the following way based on the obtained current movement information or road condition information with reference to a vehicle centerline (that is, a centerline located at the center of the vehicle body and pointing to the front of the vehicle): When the movement information is flat road movement or the road condition information is a flat road, the angle coincident with the vehicle centerline is used as a desired detection angle to obtain more surrounding environment information. When the movement information is uphill movement or the road condition information is an uphill road, an angle obtained by deviating the vehicle centerline downward by a preset first angle is used as the desired detection angle to obtain more ground environment information and avoid the loss of effective ground information caused by overhead orientation of the field of view of the lidar. When the movement information is a downhill movement or the road condition information is a downhill road, an angle obtained by deviating the vehicle centerline upward by a preset second angle is used as the desired detection angle to obtain more surrounding environment information and avoid the problem that the field of view of the lidar can obtain only the environment information at a near distance. When the movement information is a left turn movement, an angle obtained by deviating the vehicle centerline leftward by a preset third angle is used as the desired detection angle to obtain more left side environment information. When the movement information is a right turn movement, an angle obtained by deviating the vehicle centerline rightward by a preset fourth angle is used as the desired detection angle to obtain more right side environment information.

Figure 9:
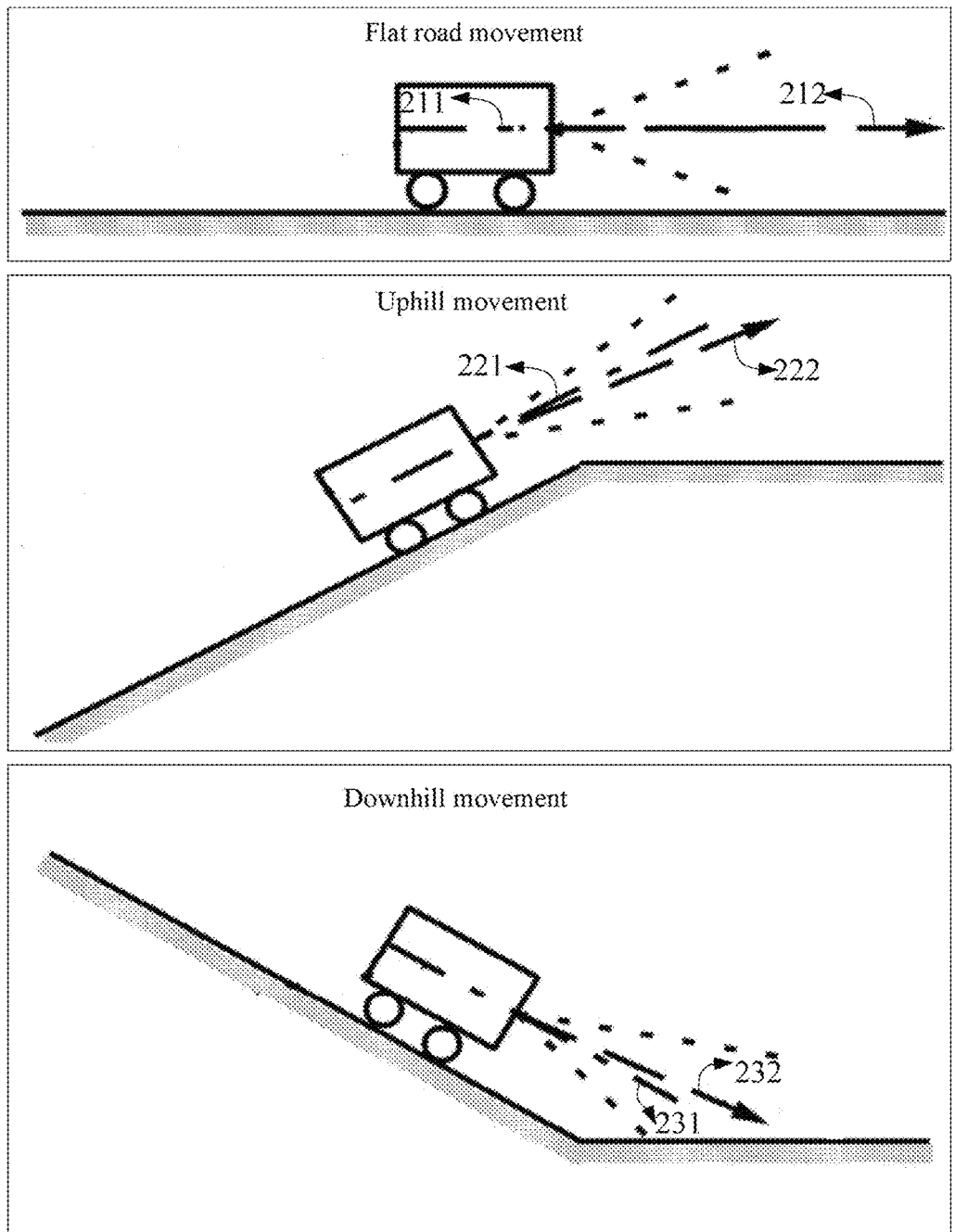
FIG. 9 is a schematic diagram of a desired detection angle according to an embodiment of this specification.

To enable those skilled in the art to better understand and implement the present invention, an embodiment of the present invention provides a schematic diagram of a desired detection angle, as shown in FIG. 9.

Referring to FIG. 9, a relationship between the desired detection angle and the vehicle centerline is as follows: When the vehicle is moving on a flat road, the desired detection angle 212 coincides with the vehicle centerline 211 to obtain more surrounding environment information. When the vehicle is moving uphill, the desired detection angle 222 is below the vehicle centerline 221 to obtain more ground environment information. When the vehicle is moving downhill, the desired detection angle 232 is above the vehicle centerline 231 to obtain more surrounding environment information.

Step S103: Adjust an orientation angle at the center of the field of view of the lidar to the desired detection angle based on the generated desired detection angle.

In specific implementation, the parameter of a scanning apparatus of the lidar may be adjusted to control the orientation angle at the center of the field of view of the lidar system to be the desired detection angle. Optionally, the scanning apparatus is a two-dimensional galvanometer. The two-dimensional galvanometer transmits the laser pulse signal, which is transmitted by the lidar, to a two-dimensional space, and receives a laser pulse echo signal reflected from the two-dimensional space. The two-dimensional galvanometer used to control the orientation angle at the center of the field of view of the lidar to be the desired detection angle facilitates engineering implementation of an integrated and miniaturized lidar. Optionally, the scanning apparatus is two one-dimensional galvanometers that are perpendicular to each other and capable of vibrating independently. The two one-dimensional galvanometers control the scanning of the vertical field of view and the scanning of the horizontal field of view respectively. The center locations of the two galvanometers are controlled by two one-dimensional galvanometers respectively to implement two-dimensional orientation at the center of the field of view of the lidar. When the scanning apparatus is a two-dimensional galvanometer, the drive voltage or drive current of the two-dimensional galvanometer may be adjusted to control the orientation angle at the center of the field of view of the lidar system to be the desired detection angle. When the scanning apparatus is two one-dimensional galvanometers that are perpendicular to each other and capable of vibrating independently, the drive voltage or drive current of the two one-dimensional galvanometers may be adjusted to control the orientation angle at the center of the field of view of the lidar system to be the desired detection angle. By using two one-dimensional galvanometers, the control is simplified, but the system size is larger.

Figure 10:
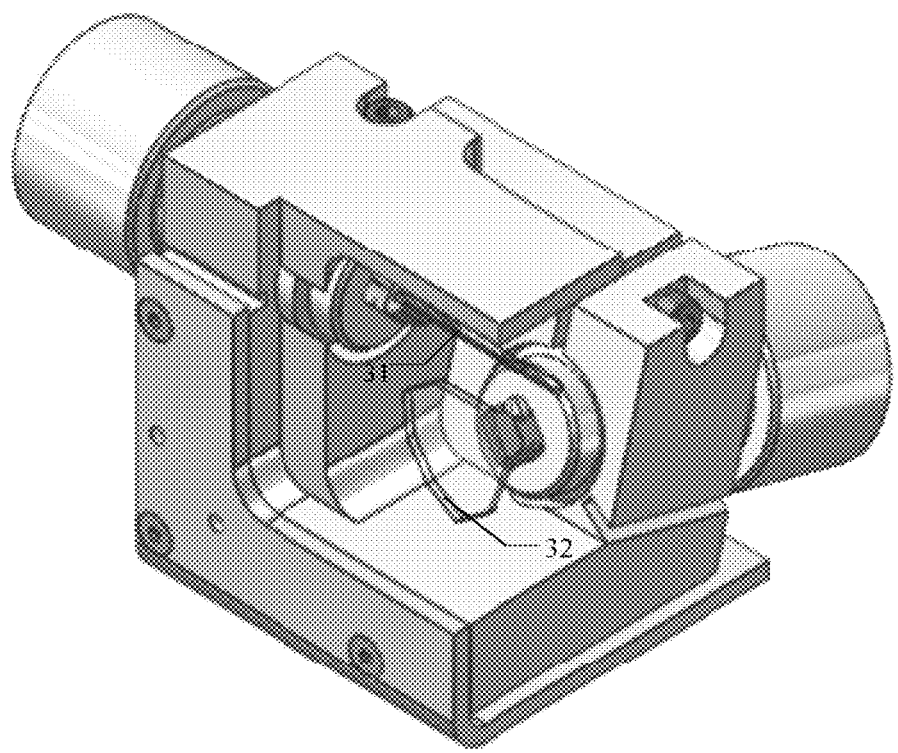
FIG. 10 is a schematic structural diagram of a scanning apparatus according to an embodiment of this specification.

To enable those skilled in the art to better understand and implement the present invention, an embodiment of the present invention provides a schematic structural diagram of a scanning apparatus, as shown in FIG. 10.

Referring to FIG. 10, the scanning apparatus includes a one-dimensional galvanometer 31 and a one-dimensional galvanometer 32. The one-dimensional galvanometer 31 and the one-dimensional galvanometer 32 are perpendicular to each other and can rotate independently.

In specific implementation, a laser pulse signal transmitted by a lidar is first incident on the one-dimensional galvanometer 31, and then reflected to the one-dimensional galvanometer 32. The laser pulse signal is reflected to a space by the one-dimensional galvanometer 32, and the one-dimensional galvanometer 32 receives a laser pulse echo signal emitted back from the space. The rotation direction of the one-dimensional galvanometer 31 is perpendicular to the rotation direction of the one-dimensional galvanometer 32, and the two galvanometers can rotate independently. Therefore, the one-dimensional galvanometer 31 and the one-dimensional galvanometer 32 can be controlled to vibrate independently, thereby controlling the orientation at the center of the horizontal field of view and the orientation at the center of the vertical field of view of the lidar, and implementing two-dimensional change of the orientation at the center of the field of view of the lidar.

In specific implementation, the lidar may be placed on a two-dimensional gimbal. Parameters of the two-dimensional gimbal, such as rotation direction parameters, are adjusted to control the orientation angle at the center of the field of view of the lidar system to be the desired detection angle.

Figure 11:
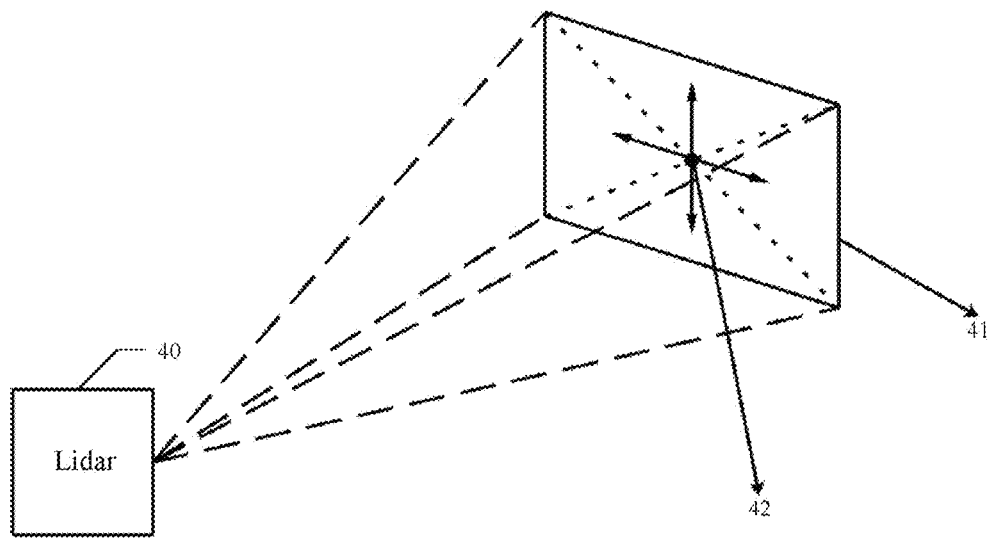
FIG. 11 is a schematic diagram of a field of view of a lidar according to an embodiment of this specification.

To enable those skilled in the art to better understand and implement the present invention, an embodiment of the present invention provides a schematic diagram of a field-of-view range of a lidar, as shown in FIG. 11.

Referring to FIG. 11, the field of view detectable by the lidar 40 is a two-dimensional plane 41, and an angle between the lidar 40 and a center point 42 of the two-dimensional plane 41 is an orientation angle at the center of the field of view of the lidar 40.

By applying the above solution, the current movement information or road condition information is obtained in real time, then the desired detection angle is generated based on the current movement information or road condition information, and the orientation angle at the center of the field of view of the lidar is adjusted to the desired detection angle. In this way, the orientation angle at the center of field of view of the lidar is adjusted in real time to adapt to different scenes during the movement process.

Figure 12:
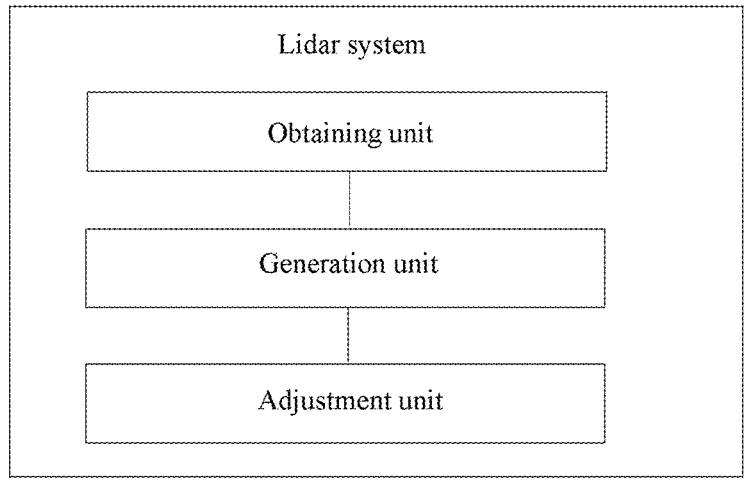
FIG. 12 is a schematic structural diagram of a lidar system according to an embodiment of this specification.

To enable those skilled in the art to better understand and implement the present invention, an embodiment of the present invention further provides a lidar system capable of implementing the method for adjusting an orientation at the center of a field of view of a lidar, as shown in FIG. 12. The lidar system may include an obtaining unit, a generating unit, and an adjusting unit.

The obtaining unit is configured to obtain a current movement direction or road condition information in real time.

The generating unit is configured to generate a desired detection angle based on the obtained current movement information or road condition information.

The adjusting unit is configured to adjust an orientation angle at the center of the field of view of the lidar to the desired detection angle based on the generated desired detection angle.

Optionally, the adjusting unit is configured to adjust a parameter of a scanning apparatus of the lidar to control the orientation angle at the center of the field of view of the lidar system to be the desired detection angle.

In specific implementation, the scanning apparatus is a two-dimensional galvanometer or two one-dimensional galvanometers that are perpendicular to each other and capable of vibrating independently.

In specific implementation, when the scanning apparatus is a two-dimensional galvanometer, the adjustment unit is configured to adjust a drive voltage or drive current of the two-dimensional galvanometer to control the orientation angle at the center of the field of view of the lidar system to be the desired detection angle. When the scanning apparatus is two one-dimensional galvanometers that are perpendicular to each other and capable of vibrating independently, the adjustment unit is configured to adjust the drive voltage or drive current of the two one-dimensional galvanometers to control the orientation angle at the center of the field of view of the lidar system to be the desired detection angle.

In an embodiment of the present invention, the lidar system further includes a two-dimensional gimbal (not shown). The adjustment unit is configured to adjust a parameter of the two-dimensional gimbal to control the orientation direction at the center of the field of view of the lidar system to be the desired detection angle.

In specific implementation, the obtaining unit is configured to obtain current road condition information in real time in at least one of the following ways: a pre-downloaded map, a point cloud map constructed by the lidar, or data captured by a camera.

In specific implementation, the generating unit includes: a first generating subunit (not shown), a second generating subunit (not shown), a third generating subunit (not shown), a fourth generating subunit (not shown), a fifth generating subunit (not shown), a sixth generating subunit (not shown), and a seventh generating subunit.

The first generating subunit is configured to use an angle in coincidence with a vehicle centerline as a desired detection angle when movement information is flat road movement or road condition information is a flat road condition.

The second generating subunit is configured to use an angle, which is obtained by deviating the vehicle centerline downward by a preset first angle, as the desired detection angle when the movement information is an uphill movement or the road condition information is an uphill road condition.

The third generating subunit is configured to use an angle, which is obtained by deviating the vehicle centerline upward by a preset second angle, as the desired detection angle when the movement information is a downhill movement or the road condition information is a downhill road condition.

The fourth generating subunit is configured to use an angle, which is obtained by deviating the vehicle centerline leftward by a preset third angle, as the desired detection angle when the movement information is a left turn movement.

The fifth generating subunit is configured to use an angle, which is obtained by deviating the vehicle centerline rightward by a preset fourth angle, as the desired detection angle when the movement information is a right turn movement.

In specific implementation, for the working process and principles of the lidar system, reference may be made to the description in the method provided in the foregoing embodiment, and details are omitted here.

Figure 13:
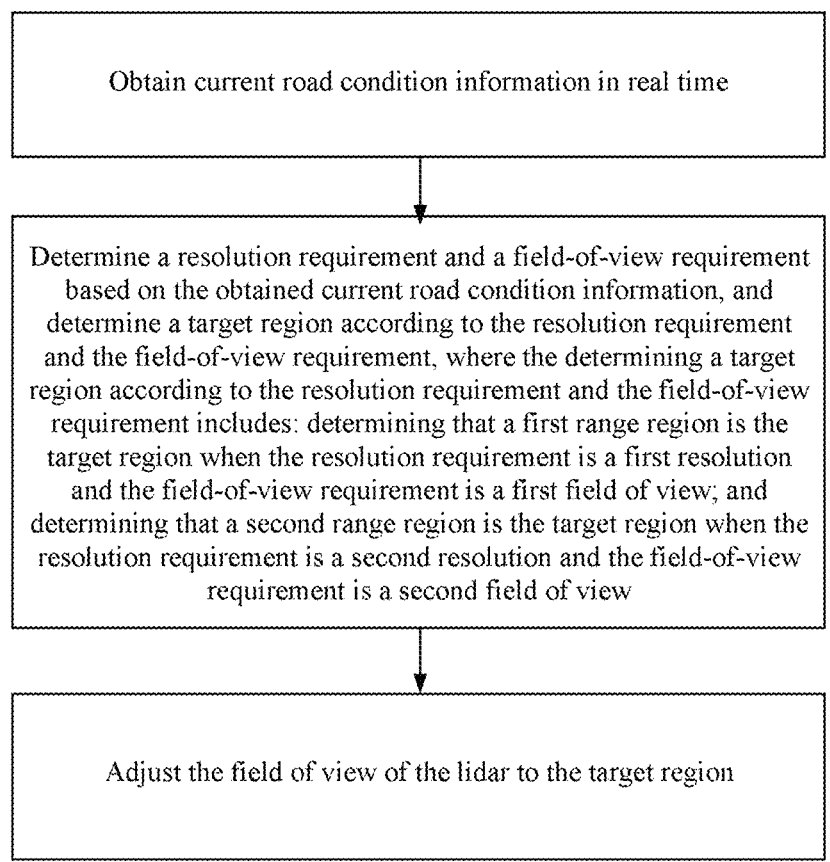
FIG. 13 is a detailed flowchart of a method for adjusting a field of view of a lidar according to an embodiment of this specification.

As shown in FIG. 13, in a possible embodiment, a method for adjusting a field of view of a lidar is provided, including:

obtaining current road condition information in real time.

The size of a field of view (FOV) of an existing lidar is fixed. Therefore, in some scenarios, in order to improve an angular resolution of the lidar, the number of pairs of transceiver modules has to be increased, resulting in increase of the size, power consumption, and costs of a lidar system. In view of this, according to the present invention, the current road condition information is obtained in real time, and then the size of the field of view of the lidar is adjusted in real time according to the obtained road condition information to meet angular resolution requirements in different scenes. The road condition information obtained in real time is all object information detected. For example, the road condition information may be a suspected vehicle object at a long distance ahead. Specifically, current road condition information may be obtained in real time based on a pre-downloaded map such as simultaneous localization and mapping (SLAM), or the current road condition information may be obtained in real time based on a point cloud map constructed by the lidar, or the current road condition information may be obtained in real time based on data captured by a vehicle-mounted camera.

determining a resolution requirement and a field-of-view requirement based on the obtained current road condition information, and determining a target region according to the resolution requirement and the field-of-view requirement.

The determining a target region according to the resolution requirement and the field-of-view requirement includes: determining that a first range region is the target region when the resolution requirement is a first resolution and the field-of-view requirement is a first field of view; determining that a second range region is the target region when the resolution requirement is a second resolution and the field-of-view requirement is a second field of view, where the first resolution is higher than the second resolution, the first field of view is smaller than the second field of view, and the first range region is smaller than the second range region. Specifically, a resolution requirement and a field-of-view requirement may be determined based on the obtained current road condition information, and a target region may be determined based on the resolution requirement and the field-of-view requirement. For example, when the road condition information is a suspected vehicle object at a long distance ahead, because a low resolution makes the object unrecognizable, the current resolution requirement is the first resolution such as a high resolution, and the field-of-view requirement is a first field of view such as a small field of view. A first range area, such as a small range area, around the suspected vehicle object a long distance ahead may be defined as a target region, thereby facilitating the lidar to shrink the field of view subsequently, scan the target region centrally, and obtain more accurate information.

adjusting the field of view of the lidar to the target region.

In specific implementation, the field of view of the lidar is adjusted to the target region. That is, the orientation of the lidar is adjusted to the target region, and the target region is detected. In specific implementation, a first range region may be selected as the target region, and the field of view of the lidar may be adjusted to the target region. For example, a suspected object is found based on current road condition information. However, due to a limited resolution, complete contour information of the suspected object is unavailable. Therefore, the current resolution requirement is a first resolution such as a high resolution, and the field-of-view requirement is a first field of view such as a small field of view. A first range region around the suspected object, such as a small range region, may be used as a target region, and the orientation of the lidar is adjusted to the target region. Because the field of view becomes smaller, the lidar can clearly distinguish the complete contour information of the suspected object. Based on the complete contour information, a sensing processing unit of a driverless system can determine the type of the suspected object and other key information after simple processing, thereby improving reliability of autonomous driving. In specific implementation, a second range region such as a wide range region may be selected as the target region, and the field of view of the lidar may be adjusted to the target region. For example, when no suspected object is found based on the current road condition information, the current resolution requirement is a second resolution, such as a low resolution, and the field-of-view requirement is a second field of view, such as a wide field of view. The field-of-view range of the lidar may be widened, the target region may be determined, and the orientation of the lidar may be adjusted to the target region. Due to the widened field of view, the lidar can detect a wide range in all related surrounding regions to find suspected objects.

In specific implementation, the parameter of a scanning apparatus of the lidar may be adjusted to control the field of view of the lidar system to be the target region.

In an embodiment of the present invention, when the scanning apparatus is a two-dimensional galvanometer, a drive voltage of the two-dimensional galvanometer is adjusted to control the field of view of the lidar to be the target region.

In specific implementation, an optical parameter of the lidar may be adjusted to control the field of view of the lidar system to be the target region.

In an embodiment of the present invention, the optical parameter is a focal length parameter of a transmitting optical system and a focal length parameter of a receiving optical system.

Figure 14:
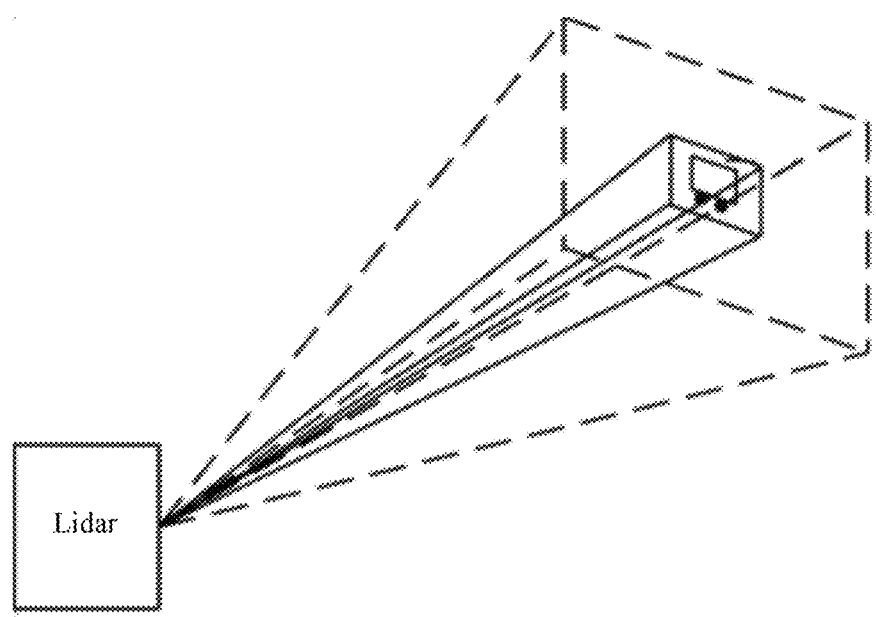
FIG. 14 is a schematic diagram of a size of a field of view of a lidar according to an embodiment of this specification.

To enable those skilled in the art to better understand and implement the present invention, an embodiment of the present invention provides a schematic diagram of a field-of-view size of a lidar, as shown in FIG. 14.

Referring to FIG. 14, road condition information in a wide field of view is obtained based on a real-time point cloud map of the lidar; then a small target region is determined based on a suspected vehicle in the road condition information obtained in real time, and a field of view of the lidar is adjusted to the small target region, that is, an orientation of the lidar is adjusted to the small target region. Because the field of view becomes smaller, the lidar can clearly distinguish complete contour information of the suspected vehicle.

Figure 15:
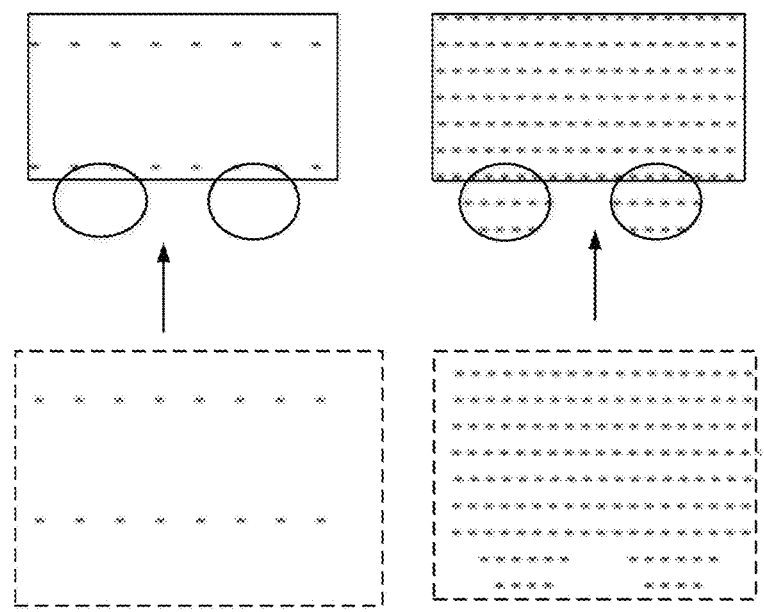
FIG. 15 is a schematic diagram of point cloud data of a lidar according to an embodiment of this specification.

To enable those skilled in the art to better understand and implement the present invention, an embodiment of the present invention provides a schematic diagram of point cloud data of a lidar. As shown in FIG. 15, for a target vehicle in a space, point cloud data detected by using a wide field of view is on the left side of the drawing, and point cloud data detected by using a small field of view is on the right side of the drawing. It can be seen that point cloud data (shown on the left side of the drawing) detected in the wide field of view is not enough (only two pieces of point cloud data are detected) for distinguishing the contour information of the target vehicle. A sensing processing unit of the driverless driving system cannot determine specific information of the target vehicle. However, after the field of view is shrunk, more point cloud data (shown on the right side of the drawing) can be detected in the small field of view, the contour information of the target vehicle can be distinguished clearly, and a sensor of a driverless system can determine the type of the target vehicle and other key information through simple processing.

By applying the above solution, the current road condition information is obtained in real time, the target region is determined based on the obtained current road condition information, and the field of view of the lidar is adjusted to the target region. In this way, without increasing costs or affecting ranging, the size of the target region can be adjusted in real time based on the current road condition information, and the size of the field of view of the lidar is adjusted in real time to adapt to different resolution scenes.

A person of ordinary skill in the art may understand that all or some of the steps of the various methods in the foregoing embodiments may be implemented by a program instructing relevant hardware. The program may be stored in a computer-readable storage medium. The storage medium may include a read-only memory (ROM), a random access memory (RAM), a magnetic disk, an optical disc, or the like.

The foregoing descriptions are merely exemplary embodiments of this specification, but are not intended to limit this specification. Any modification, equivalent replacement, or improvement made without departing from the spirit and principle of this specification should fall within the protection scope of this specification.

What is claimed is:

1. A detection device, comprising:
a lidar having a plurality of laser transceivers and a scanner, wherein the each of the plurality of laser transceivers is configured to emit light to the scanner at a respective incident angle to produce an individual field of view to collectively form a first field of view in a first resolution, and the lidar is configured to collect environment information in real time using the first field of view;
a real-time location information obtaining module, configured to obtain location information in real time;
a parameter determining module, configured to determine a value of a target parameter of the lidar based on the obtained environment information and the obtained location information, wherein the target parameter includes the first resolution in the first field of view and a power of the lidar, and the parameter determining module is configured to:
change the first resolution of the first field of view based on detecting an object in the environment information, wherein the changing comprises adjusting the respective incident angles of the laser transceivers to produce a second field of view such that the second field of view is formed by an overlapping region of two or more of the individual fields of view of the laser transceivers, wherein the second field of view has a second resolution greater than the first resolution, and wherein the second field of view is smaller than the first field of view, and
dynamically adjust the power of the lidar in response to detected reflectance of road obstacles; and
a parameter adjustment module, configured to adjust a parameter of the lidar in real time based on the second field of view having the second resolution, wherein the lidar is configured to detect the object with the second resolution of the second field of view and the adjusted power of the lidar, and wherein the parameter adjustment module is further configured to adjust a current field of view of the lidar from focusing on a view directly ahead a vehicle to an entire field of view when the vehicle is moved from an expressway to a city street.

2. The detection device according to claim 1, wherein the environment information comprises at least one of: weather information, road condition information, or traffic indication information;

or, the location information comprises: an absolute location, and map information near the absolute location;

or, the detection device further comprises at least one of: a vision sensor, a millimeter wave radar, a laser rangefinder, or an infrared night vision device;

or, the target parameter of the lidar comprises at least one of: a field-of-view range of the lidar, a wavelength of the lidar, a horizontal resolution of the lidar, a vertical resolution of the lidar, a scanning frequency of the lidar, a beam tilt angle of the lidar, or the power of the lidar.

3. The detection device according to claim 1, wherein each of the laser transceivers is a coaxial laser transceiver or a non-coaxial laser transceiver.

4. The detection device according to claim 1, wherein each of the respective incident angles is configured to stitch the individual fields of view.

5. The detection device according to claim 1, wherein the parameter determining module comprises: a desired detection angle generating submodule, configured to generate a desired detection angle based on the obtained environment information and the obtained location information, wherein the desired detection angle generating submodule comprises:
   a first determining submodule, configured to use a first angle in coincidence with a vehicle centerline from back to front as a desired detection angle when movement information is flat road movement or road condition information is a flat road condition;
   a second determining submodule, configured to use a second angle, which is obtained by deviating the vehicle centerline downward by a preset first angle, as the desired detection angle when the movement information is an uphill movement or the road condition information is an uphill road condition;
   a third determining submodule, configured to use a third angle, which is obtained by deviating the vehicle centerline upward by a preset second angle, as the desired detection angle when the movement information is a downhill movement or the road condition information is a downhill road condition;
   a fourth determining submodule, configured to use an angle, which is obtained by deviating the vehicle centerline leftward by a preset third angle, as the desired detection angle when the movement information is a left turn movement; and
   a fifth determining submodule, configured to use an angle, which is obtained by deviating the vehicle centerline rightward by a preset fourth angle, as the desired detection angle when the movement information is a right turn movement,
   wherein the parameter adjustment module is configured to adjust an orientation angle at a center of the current field of view of the lidar to the desired detection angle.

6. The detection device according to claim 1, wherein the parameter determining module comprises a target region determining submodule;
   the target region determining submodule is configured to determine a resolution requirement and a field-of-view requirement based on the obtained environment information, and determine a target region according to the resolution requirement and the field-of-view requirement; and
   the parameter adjustment module is configured to adjust the current field of view of the lidar to the target region.

7. The detection device according to claim 6, wherein the target region determining submodule, is configured to obtain environment information of a first field-of-view range based on a real-time point cloud map of the lidar; and then determine a target region in a second field-of-view range based on a suspected object in the environment information of the first field-of-view range, and adjust the current field of view of the lidar to the target region in the second field-of-view range; and
   a resolution of the target region in the second field-of-view range is higher than a resolution of the first field-of-view range, and high resolution information of the suspected object is obtained based on the target region of the second field-of-view range.

8. A method, comprising:
collecting environment information around a vehicle in real time with a lidar having a first resolution of a first field of view, wherein the lidar having a plurality of laser transceivers and a scanner, wherein the each of the plurality of laser transceivers is configured to emit light to the scanner at a respective incident angle to produce an individual field of view to collectively form the first field of view in the first resolution;
obtaining location information of the vehicle in real time;
determining a value of a target parameter of a vehicle-mounted detection device that includes the lidar based on the obtained environment information around the vehicle and the location information of the vehicle, wherein the target parameter includes the first resolution in the first field of view and a power of the lidar;
in response to detecting an object in the environment information, adjusting the respective incident angles of the laser transceivers to produce a second field of view such that the second field of view is formed by an overlapping region of two or more of the individual fields of view of the laser transceivers, wherein the second field of view has a second resolution greater than the first resolution, and wherein the second field of view is smaller than the first field of view;
dynamically adjusting the power of the lidar in response to detected reflectance of road obstacles around the vehicle;
detecting the object with the second resolution of the second field of view and the adjusted power of the lidar,
wherein the determining of the value of the target parameter of the vehicle-mounted detection device comprises:
adjusting a current field of view of the vehicle-mounted detection device from focusing on a view directly ahead the vehicle to an entire field of view when the vehicle is moved from an expressway to a city street.

9. The method according to claim 8, wherein the environment information comprises at least one of: weather information, road condition information, or traffic indication information;
   or, the location information comprises: an absolute location, and map information near the absolute location;
   or, the vehicle-mounted detection device further comprises at least one of: a vision sensor, a millimeter wave radar, a laser rangefinder, or an infrared night vision device;
   or, the target parameter of the vehicle-mounted detection device comprises at least one of: a field-of-view range of the vehicle-mounted detection device, a wavelength of the vehicle-mounted detection device, a horizontal resolution of the vehicle-mounted detection device, a vertical resolution of the vehicle-mounted detection device, a scanning frequency of the vehicle-mounted detection device, a beam tilt angle of the vehicle-mounted detection device, or a power of the vehicle-mounted detection device.

10. The method according to claim 8, further comprising:
generating a desired detection angle based on the obtained environment information and the obtained location information, by:
- using a first angle in coincidence with a vehicle centerline from back to front as a desired detection angle when movement information is flat road movement or road condition information is a flat road condition;
- using a second angle, which is obtained by deviating the vehicle centerline downward by a preset first angle, as the desired detection angle when the movement information is an uphill movement or the road condition information is an uphill road condition;
- using a third angle, which is obtained by deviating the vehicle centerline upward by a preset second angle, as the desired detection angle when the movement information is a downhill movement or the road condition information is a downhill road condition;
- using a fourth angle, which is obtained by deviating the vehicle centerline leftward by a preset third angle, as the desired detection angle when the movement information is a left turn movement; and
- using a fifth angle, which is obtained by deviating the vehicle centerline rightward by a preset fourth angle, as the desired detection angle when the movement information is a right turn movement; and adjusting an orientation angle at a center of the current field of view of the vehicle-mounted detection device in real time to the desired detection angle.

11. The method according to claim 8, further comprising:
determining a resolution requirement and a field-of-view requirement based on the obtained environment information;
determining a target region according to the resolution requirement and the field-of-view requirement; and
adjusting the current field of view of the vehicle-mounted detection device to the target region.

12. The method according to claim 11, wherein the target region is determined by:
obtaining environment information of a first field-of-view range based on a real-time point cloud map of the vehicle-mounted detection device;
determining a target region in a second field-of-view range based on a suspected object in the environment information of the first field-of-view range; and
adjust the current field of view of the vehicle-mounted detection device to the target region in the second field-of-view range,
wherein a resolution of the target region in the second field-of-view range is higher than a resolution of the first field-of-view range.

* * * * *